Aug. 9, 1955  A. M. SCHEWEL  2,715,043
VEHICLE SUN VISOR
Filed April 7, 1952
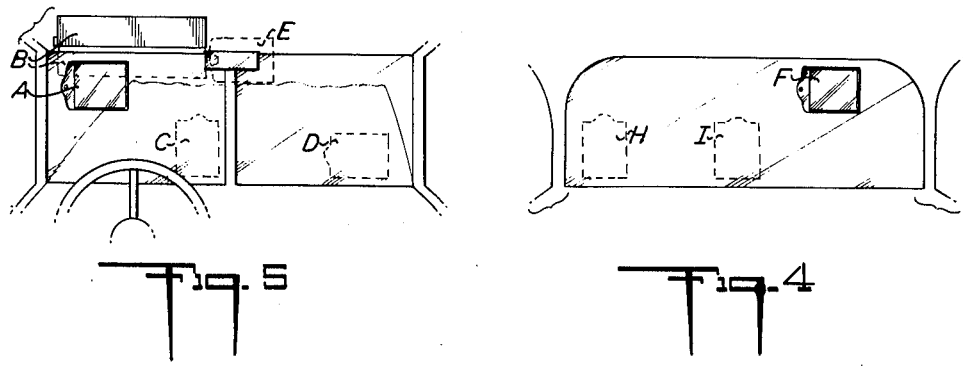
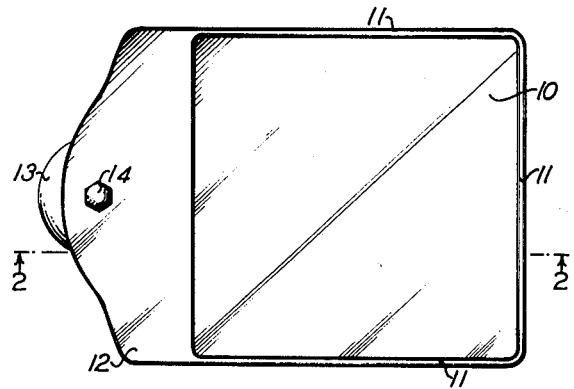
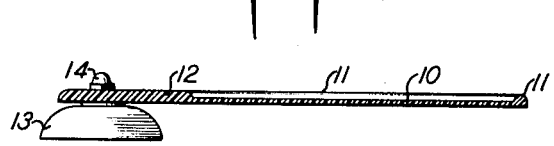
INVENTOR
ABE M. SCHEWEL
BY
Sol B Wicgel
ATTORNEY United States Patent Office 2,715,043
Patented Aug. 9, 1955

2,715,043

VEHICLE SUN VISOR

Abe M. Schewel, Lynchburg, Va.

Application April 7, 1952, Serial No. 280,917

2 Claims. (Cl. 296—97)

This invention relates to a sun visor adapted to be conveniently posted about a vehicle to intercept glaring light rays. More particularly the sun visor of the present invention is a small plate-like light glare interceptor having ready attachment means such as a rubber suction cup for fastening the same to a glass pane, the light screen portion thereof being designed to have optimum light-transmission in a critical range of thickness, while being supported by an integrally formed framing portion preventing vibration and vision aberration of the light screening film while supporting the same.

The sun visor hereof comprises a conveniently dimensioned pane comprising a thin film of transparent substance such as plastic material containing a glare retarding quantity of pigmenting dye and adjusted in thickness critically to substantially the minimum necessary to diffuse light glare with minimum reduction of vision.

According to the present invention the light screening pane has a thickness generally substantially less than requisite to form a rigid edgewise sustaining film or pane of plastic. The thin and flexible pane of plastic is given utility for a sun visor by integrally mounting about the edges thereof a stiffening frame comprising a rib of sufficient rigidity and thickness to firmly support the pane as a flat transparent film in its use as a sun visor. The ribs framing the thin film panel simultaneously reduce undulations and vibrations of the film when mounted against the pane of the glass windshield, rear view mirror, or other light transmitting or reflecting portions of a vehicle wherein it is typically used, to reduce interference from glaring sun rays or lights from other vehicles.

The sun visor as thus described has further mounted at one of the edges thereof an enlarged flat marginal plastic portion of substantially the same thickness as the supporting rib to allow support of the entire structure including the plastic pane and framed edges thereof, by being perforated and carrying mounted therein at least one fastening device for secure attachment to a glass pane such as a rubber suction cup.

In the drawings:

Fig. 1 is a plan view of the sun visor.

Fig. 2 is a section taken through the sun visor on the line 2—2 of Fig. 1.

Fig. 3 is a modified form of sun visor according to the present invention comprising a similar section on the line 2—2 of Fig. 1 wherein the reinforcing supporting and ribbing portion is attached to the transparent plastic pane as a lamination.

Fig. 4 illustrates the ready application of the pane to obstruct glaring light rays mounted in a desirable position in the rear window of a vehicle.

Fig. 5 illustrates a similarly desirable application of the sun visor mounted in desirable positions in the front of a vehicle such as on the windshield before the driver, or on the rear view mirror to intercept glaring light rays.

As thus illustrated, the sun visor comprises a transparent flexible plastic pane 10 of substantially minimum thickness to intercept glaring light rays having a critical thickness in the range of 7 to 35 mils. This thickness is sufficient to obstruct glaring light rays by being partially absorbed or diffused by the pigment in the plastic material while allowing maximum transfer of non-glaring light to give minimum obstruction of vision. In such thickness the plastic pane is quite thin and flexible but sufficiently strong and durable for the present utility. The film is so thin that it is highly flexible and generally not even self sustaining. The film 10 as thus described is supported around the edges by a stiffening rib 11 which is fixed integrally to and around the edges of the pane. The rib 11 is preferably light transparent and similarly formed of plastic and mounted integrally with the pane 10, firmly supports the same to reduce vibration and undulations in the surface of the framed film to avoid aberration and other obstruction of visibility in use of the highly flexible membrane 10.

To support the entire unit comprising the flexible plastic pane and stiffening ribs a wide transparent marginal portion 12 is mounted at one edge integrally with the rib 11 at this edge and pane 10, and desirably but not essentially having the same thickness as the rib 11. This marginal supporting element 12 is sufficiently thick to rigidly support the rib and pane frame the edge thereof as shown. The marginal supporting portion 12 is also desirably highly transparent and is most economically made of the same plastic material to reduce obstruction of the view when mounted on a windshield, etc. while acting as a firm support for the entire assembly.

The marginal portion 12 further has mounted thereon near the outer edge thereof at least one fastening element 13 such as a rubber suction cup which carries partially embedded therein the shank of a bolt threaded to receive a nut 14, the marginal portion 12 being bored to receive the bolt for fastening the suction cup thereto as shown. Fig. 2 illustrates the rib portion 11 and side supporting marginal portion 12 which are desirably formed integrally throughout with the pane 10, and of the same plastic material.

In an alternative construction, the sun visor hereof may be assembled from a single transparent plastic pane 10 over which has mounted at the edges thereof a supporting frame whereby the plastic panel is supported in the same manner as shown in Fig. 2. In this modification, the framing element is attached to the thin plastic film panel 10 by adhering the same thereto as a laminate as shown in Fig. 3. For this modification the rib portion 15 is adhered to the edges of the panel 10 by any suitable adhesive to form a marginal frame thereof and to firmly support the same, the rib portion 15 being integral at one edge with a wide marginal assembly supporting portion 16. The marginal portion 16 may also be laminated to the pane 10 the thick marginal portion, similar to the marginal portion 12 of Fig. 1 for support of the assembled plastic body from an edge thereof. This marginal portion 16 and the underlying pane 10 is similarly perforated to receive the suction cup fastener 13 applied thereto by a bolt and nut as shown.

The plastic hereof is of any highly transparent plastic film forming material of sufficient strength to have the present utility. Suitable plastics are the polystyrenes, polyacrylates and methacrylates, polyvinyl or vinylidene chlorides, acetates, acetals, and mixtures thereof, and chlorinated rubbers, sufficiently plasticized to be non-brittle, but retaining the strength and rigidity of the plastic to maximum degree in thin films.

The plastic has dissolved therein a small quantity of a light absorbing dye such as pale green, blue, rose, or amber as desired to absorb glaring light rays without substantially interfering with non-glaring light transmission using the common dyes as colors, such as known in the art. The dye is homogeneously dissolved in the molding composition prior to extrusion into films or injection molding to the form herein above described.

As indicated above the sun visor pane is an thin as practicable for minimum intereference with visibility in the range of 7 to 35 mils.

Where the product is injection molded to form the thin panel, framing ribs and marginal support portions as a single integral casting, the larger thickness of the range such as 20 to 35 mils may be necessary to avoid working imperfections such as pin holes. Where the product is formed of an initially cast film subsequently assembled with the ribbing and marginal support element by laminating the same thereto, the thinner film panel thickness is possible.

The ribbing and marginal support portions are thick enough to supply the necessary support and rigidity for the panel, such being desirably low for minimum light interference. A rib of ⅛ inch is most suitable, but this may be varied such as from ¹⁄₁₆ to ³⁄₁₆ inch as desired, depending upon the strength of the plastic and the transparency.

The suction cup is usually mounted after a considerable marginal support portion has been left at the edge such as by placing the cup ½ to 1½ inches from the pane to provide in the marginal support portion sufficient thick material to allow gripping the same by the fingers in the hands of the operator to fasten, adjust the position, and remove the visor to and from the desired position on the windshield or elsewhere about the vehicle. Thus it is unnecessary to touch the relatively more fragile pane or panel portion of the sun visor in attaching, adjusting the position, or removing the device to or from its position in use.

As thus described a small thin panel of plastic is provided which is thin and flexible to give minimum obstruction of vision while sufficing to intercept glare. The thin plastic pane or panel is reinforced with a framing stiffening and supporting rib extending about the edges thereof to hold it sufficiently rigid in a plane and prevent undulations and vibrations in use. The reinforced assembly is supported by a wide thickened portion extending from one edge which allows handling and manipulation to post the visor in various places about the vehicle for use and which carries a fastening device such as one or more suction cups through which the visor is securely fastened to a glass surface to intercept glaring light rays passing therefrom.

The sun visor hereof as described is adapted to be placed in any position on the windshield or if desired upon the rear view mirror or rear window or other glass portions about the vehicle. The utility of this visor is in contrast to the normal sun visor generally associated with modern vehicles which is in a relatively permanently fixed position.

Thus, as illustrated in Fig. 5 the sun visor may be placed in the position lettered A, somewhat similar to the position that might be used with the conventional sun visor B normally mounted in conventional vehicle construction above a windshield. The small sun visor of this invention may be placed as desired in many positions that the normally fixed sun visor B usually permanently mounted on the vehicle can not reach. Thus as shown in the dotted line position C this auxiliary visor may be placed in other portions of the window and at other angles, for example, to intercept reflected light rays from the hood of the automobile; or in a position D for the comfort of a passenger in an opposite windshield; or in a position E mounted directly against the glass of the rear view mirror.

Alternatively or additionally, a sun visor F may be mounted in the rear window of the vehicle as shown in Fig. 4 for intercepting sun light from the back of the vehicle; or in a dotted line position H or I of the rear view window to intercept glaring light rays from other vehicles or particular angles of the sun, using one or more of these readily applied sun visors as desired. The auxiliary nature of the present sun visor is further illustrated in Fig. 5 showing the normal sun visor in dotted line position in use in which case the auxiliary sun visor will be placed independently or simultaneously in a position C so that both the ordinary vehicle sun visor B and the present sun visor would be used in combination. In such auxiliary use, of course, the sun visor would not be placed in a position A.

Thus it will be appreciated that this sun visor has maximum utility in being readily applied by posting in any desired portion of the vehicle in contrast to normal sun visors in present day use. In further contrast to known sun visors of the readily applicable type, the sun visor of this invention will not obstruct visibility by allowing maximum passage of diffuse light.

The term sun visor as used herein is intended to refer to a device placeable on a window, windshield or mirror of a vehicle to interupt and diffuse glaring light without destroying visibility whether or not such light is caused by sun or by lights of other vehicles transmitted or reflected.

I claim:

1. A vehicle sun visor comprising a colored plastic panel consisting of a plastic film so thin and flexible as to be substantially non-selfsustaining as a plane sheet having only sufficient color to interrupt glaring light rays without substantially obstructing normal diffuse light visibility therethrough, said panel being stiffened and supported by an evenly thick transparent plastic framing rib having sufficient rigidity and thickness as compared to the flexible transparent panel to firmly sustain the same in a flat plane fixedly mounted around the edges of said panel and having a wide stiff marginal portion integral with one edge, said wide marginal portion being of the same thickness as said framing rib and adapted to support and handle said rib stiffened flexible panel, said marginal portion carrying a rubber suction cap adapted to support and fasten said sun visor to a glass surface.

2. A vehicle sun visor comprising a colored plastic panel consisting of a plastic film so thin and flexible as to be substantially non-selfsustaining as a plane sheet having only sufficient color to interrupt glaring light rays without substantially obstructing normal diffuse light visibility therethrough, said panel being stiffened and supported by an evenly thick transparent plastic framing rib having sufficient rigidity and thickness as compared to the flexible transparent panel to firmly sustain the same in a flat plane fixedly mounted around the edges of said panel and having a wide stiff marginal portion integral with one edge, said wide marginal portion being of the same thickness as said framing rib and adapted to support and handle said rib stiffened flexible panel, said marginal portion carrying a rubber suction cup adapted to support and fasten said sun visor to a glass surface, said marginal and rib members being mounted to the edges of the flexible panel portion by adhesion to the edges thereof as a laminate.

References Cited in the file of this patent

UNITED STATES PATENTS

| | | |
|---|---|---|
| 1,606,853 | Trisler | Nov. 16, 1926 |
| 1,610,305 | Muncie | Dec. 14, 1926 |
| 1,849,338 | Stansberry | Mar. 15, 1932 |
| 2,160,504 | Jacobs | May 30, 1939 |
| 2,160,505 | Jacobs | May 30, 1939 |

FOREIGN PATENTS

| | | |
|---|---|---|
| 620,571 | France | Jan. 22, 1927 |
| 324,733 | Great Britain | Feb. 6, 1930 |